M. HUTCHINS.
COMBINED HARROW AND FIELD ROLLER.

No. 177,720.  Patented May 23, 1876.

Witnesses:
A. M. Leonard,
H. E. Metcalf,

Inventor:
Milton Hutchins
Per C. A. Shaw,
Atty.

UNITED STATES PATENT OFFICE.

MILTON HUTCHINS, OF CARLISLE, MASSACHUSETTS.

IMPROVEMENT IN COMBINED HARROWS AND FIELD-ROLLERS.

Specification forming part of Letters Patent No. 177,720, dated May 23, 1876; application filed April 5, 1876.

*To all whom it may concern:*

Be it known that I, MILTON HUTCHINS, of Carlisle, in the county of Middlesex, State of Massachusetts, have invented a certain new and useful Improvement in Combined Harrows and Field-Rollers, of which the following is a description sufficiently full, clear, and exact to enable any person skilled in the art or science to which my invention appertains to make and use the same, reference being had to the accompanying drawing, forming a part of this specification, in which—

Figure 1:
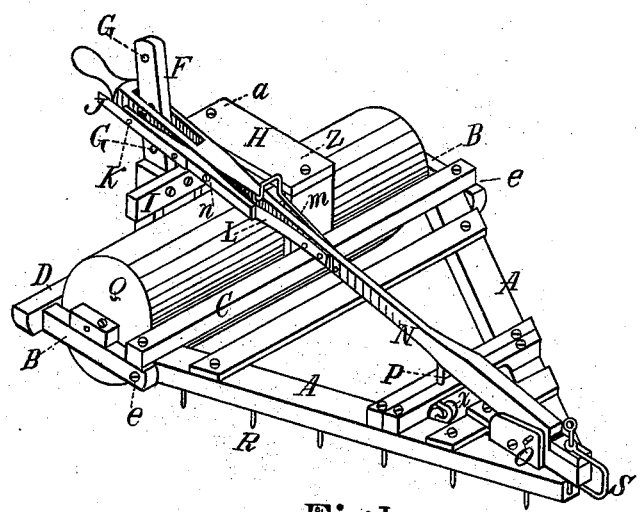
Figure 2:
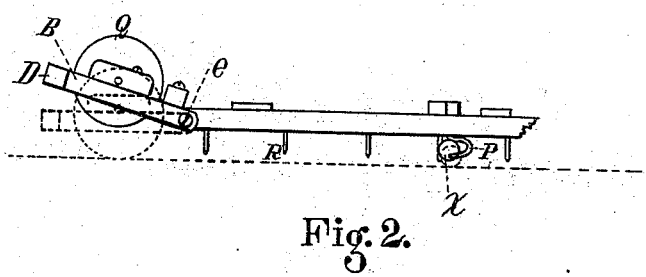

Figure 1 is an isometrical perspective view, and Fig. 2 a vertical longitudinal section.

Like letters of reference indicate corresponding parts in the different figures of the drawing.

My invention relates to a new agricultural implement in which a harrow and field-roller are combined with mechanism for automatically controlling or governing the action of the harrow; and consists in a novel construction and arrangement of the parts, as hereinafter more fully set forth and claimed, by which a more effective device of this character is produced than is now in ordinary use.

The nature and operation of my invention will be readily understood by all conversant with such matters from the following description.

In the drawing, A represents the frame-work of the harrow, which is triangular in form, and provided with the ordinary teeth R.

A roller, Q, is journaled horizontally in the rectangular frame-work B C D, and is jointed to the base or rear end of the harrow-frame at *e*.

A lever or tongue, N, is pivoted at O to the forward end of the frame-work of the harrow, and projecting downwardly from this lever there is a bar, P, carrying the journaled truck *x* in its lower end. This lever extends backwardly over the center of the roller, and is provided with a mortise near its rear end, in which the inclined standard F works as the lever is raised and depressed. The standard is provided with a series of lateral perforations, G, and is rigidly supported in the frame I attached to the frame B C D at the rear of the rollers.

A lever, J, is pivoted at *n* to the side of the tongue N, and provided with a laterally-projecting pin, K, which passes through a hole in the tongue into the holes G, and operates to support the tongue at any desired elevation, a spring, L, acting expansively under one end of the lever to force the pin into the holes, and a catch, *m*, to keep the pin withdrawn when the free end of the lever is depressed, in a manner which will be readily understood from the foregoing description.

The driver's seat H is mounted on the bars D C of the frame-work B C D, being disposed at one side of the tongue N and arranged to span the roller Q, as shown. The roller being centrally journaled in the cross-bar B of the frame-work, in which it is hung, it will be evident that the driver of the implement may, to a certain degree, elevate or depress the forward end of the frame-work B C D, and rear end of the harrow, at will, when the pin K is withdrawn, by simply changing his position on the seat H, moving to the end *a* to elevate, and to the end *z* to depress, the same.

It will also be obvious that when the tongue N is depressed the truck *x* will be brought into contact with the ground, and the forward end of the harrow will be elevated accordingly. The vertical movements of the rear end are principally controlled by the position of the tongue N in respect to the standard F, a depression of the tongue operating to elevate this portion of the harrow, and vice versa.

Having thus explained my invention, what I claim is—

In a combined harrow and field-roller, substantially such as described, the combination of the roller Q, harrow A, hinged frame B C D, seat H, adjustable tongue N, truck *x*, standard F, lever J, and pin K, arranged to operate substantially as set forth and specified.

MILTON HUTCHINS. [L. S.]

Witnesses:
JUSTUS RICHARDS,
THOS. H. ELLIOTT.